(12) United States Patent
Cox et al.

(10) Patent No.: US 9,725,162 B2
(45) Date of Patent: Aug. 8, 2017

(54) SYSTEM AND METHOD FOR IMPROVING EFFICIENCY OF AIRCRAFT GATE SERVICES AND TURNAROUND

(71) Applicant: Borealis Technical Limited, North Plains, OR (US)

(72) Inventors: Isaiah W. Cox, London (GB); Joseph J. Cox, Portland, OR (US); Jan Vana, Prague (CZ)

(73) Assignee: Borealis Technical Limited, Gibraltar (GI)

( * ) Notice: Subject to any disclaimer, the term of this patent is extended or adjusted under 35 U.S.C. 154(b) by 105 days.

(21) Appl. No.: 14/547,144

(22) Filed: Nov. 19, 2014

(65) Prior Publication Data

US 2015/0076280 A1 Mar. 19, 2015
US 2015/0274284 A2 Oct. 1, 2015

Related U.S. Application Data

(63) Continuation-in-part of application No. 14/326,281, filed on Jul. 8, 2014.
(Continued)

(51) Int. Cl.
*B64F 1/30* (2006.01)
*B64F 1/32* (2006.01)
(Continued)

(52) U.S. Cl.
CPC ............. *B64C 25/405* (2013.01); *B64D 9/00* (2013.01); *B64F 1/305* (2013.01); *B64F 1/32* (2013.01); *B64F 1/368* (2013.01); *Y02T 50/823* (2013.01)

(58) Field of Classification Search
CPC .......... B64F 1/305; B64F 1/3055; B64F 1/30; B64F 1/32; B64F 1/36; B64F 1/368; B64C 25/405; B64D 2205/00
See application file for complete search history.

(56) References Cited

U.S. PATENT DOCUMENTS 2,875,475 A 3/1959 Read et al.
3,184,772 A 5/1965 Moore et al.
(Continued)

OTHER PUBLICATIONS

Federal Aviation Administration (FAA), Advisory Circular AC 150/5360-13, Apr. 22, 1988. Chapter 4, "Terminal Apron Areas", pp. 29-52.*
(Continued)

*Primary Examiner* — Tien Dinh
*Assistant Examiner* — Richard R Green (57) ABSTRACT

A system and method is provided for improving efficiency of aircraft gate services and reducing time spent by an aircraft parked parallel to an airport terminal wherein aircraft utilities and gate services provided during turnaround are supported by an arrangement of flexibly movable, service and utility-carrying extendable passenger boarding bridges that enable passenger and baggage exchange concurrently with connection of utilities and provision of gate services to the aircraft. Baggage transfer is facilitated by conveyors mounted on one or more loading bridges and designed to provide a direct connection between an aircraft and a terminal. Aircraft are maneuvered by a pilot into and out of a parallel parking location in a forward direction by an engines-off electric taxi system, enabling loading bridge, utility, and service connections to be made to multiple aircraft doors as soon as the aircraft reaches a parking location and then quickly disconnected upon departure.

7 Claims, 4 Drawing Sheets

Related U.S. Application Data (60) Provisional application No. 61/843,877, filed on Jul. 8, 2013.

(51) Int. Cl.
  *B64F 1/36* (2017.01)
  *B64C 25/40* (2006.01)
  *B64F 1/305* (2006.01)
  *B64D 9/00* (2006.01)

(56) References Cited

U.S. PATENT DOCUMENTS

| | | | |
|---|---|---|---|
| 3,521,316 A | | 7/1970 | Adams et al. |
| 3,664,456 A | | 5/1972 | Smith, Sr. et al. |
| 3,916,588 A | | 11/1975 | Magill |
| 4,416,435 A | * | 11/1983 | Szendrodi ............... B64F 1/368 244/137.2 |
| 4,620,339 A | | 11/1986 | Shepheard |
| 5,149,017 A | | 9/1992 | McEntire et al. |
| 5,505,237 A | | 4/1996 | Magne |
| 6,657,334 B1 | | 12/2003 | Edelson |
| 6,838,791 B2 | | 1/2005 | Edelson |
| 6,863,243 B2 | * | 3/2005 | Konya ................... B64F 1/305 244/137.2 |
| 7,039,978 B2 | | 5/2006 | Hutton |
| 7,116,019 B2 | | 10/2006 | Edelson |
| 7,275,715 B2 | | 10/2007 | McCoskey et al. |
| 7,469,858 B2 | | 12/2008 | Edelson |
| 7,614,585 B2 | | 11/2009 | McCoskey et al. |
| 2002/0164236 A1 | | 11/2002 | Fukuhara et al. |
| 2006/0237591 A1 | | 10/2006 | McCoskey et al. |
| 2006/0273686 A1 | | 12/2006 | Edelson et al. |
| 2013/0068890 A1 | * | 3/2013 | Boren ...................... B64F 1/30 244/137.2 |

OTHER PUBLICATIONS

Over-the-Wing Rear-door Bridge, FMT Aircraft Gate Support Systems, Sweden.

"Crystal Bridge", ThyssenKrupp Airport Systems, Extendable and Retractable Loading Bridge.

\* cited by examiner

SYSTEM AND METHOD FOR IMPROVING EFFICIENCY OF AIRCRAFT GATE SERVICES AND TURNAROUND

PRIORITY CLAIM

This application is a continuation-in-part of U.S. patent application Ser. No. 14/326,281, filed 8 Jul. 2014, which claims priority from U.S. Provisional Patent Application No. 61/843,877, filed 8 Jul. 2013, the disclosures of the aforementioned applications being fully incorporated herein.

TECHNICAL FIELD

The present invention relates generally to turnaround activities and services provided at airport gates to aircraft between arrival and departure and specifically to a method for improving the efficiency of gate services and to improve turnaround and significantly reduce time aircraft spend on the ground at a gate between arrival and departure.

BACKGROUND OF THE INVENTION

When aircraft land at most large airports today, they operate one or more of their main engines to power their ground travel as they taxi from a touchdown runway to an assigned terminal arrival gate. Although specific procedures may vary at different airports, most airport terminal gates are equipped with passenger loading bridges that are moved into place when an aircraft has arrived at the gate to provide a connection between the aircraft and the terminal. Currently, a loading bridge cannot be connected to an aircraft until the main engines powering the aircraft have been shut down, and it is safe to approach the aircraft. When the loading bridge has been connected to an aircraft door, usually the door closest to the forward or nose end of the aircraft, and the aircraft door have been opened, passengers and crew can leave the aircraft and walk to the terminal through the loading bridge. Loading bridges are designed to provide a pathway between an aircraft interior and an airport terminal building that shelters passengers and crew from the surrounding environment. While deplaning passengers are walking through a loading bridge to the terminal, ground service personnel and vehicles arrive at the aircraft to provide services required before the aircraft can depart from the gate for its next flight. At many airports, loading bridges are not available, and passengers may be required to walk down stairs that are either integral with the aircraft or brought to the aircraft by ground personnel. When the aircraft's engines are used for taxi, ground service personnel and vehicles cannot safely approach the aircraft and passengers cannot board the aircraft until after the engines have been shut down, which adds time to aircraft turnaround.

Typically, before an aircraft is ready to depart a terminal gate, arriving passengers' baggage must be unloaded and departing passengers' baggage must be loaded, the aircraft must be fueled, lavatories may be cleaned and waste water removed, potable water may be supplied to the aircraft, trash may be removed, catering supplies may be delivered, and other services may be performed or provided. The level of services performed or provided depends, in part, on the airline operating the aircraft. A low cost carrier flying commuters between cities may not perform or provide all of the foregoing kinds of services every time the aircraft turns around. An airline that flies long distance international flights is more likely to perform or provide all of them.

The airline industry has recognized the importance of efficiently unloading and loading passengers and providing the requisite servicing of aircraft so aircraft can be turned around as quickly as possible to maintain an airline's flight schedule and achieve the highest aircraft utilization possible. Moreover, an airline's potential profits may be increased the less time an aircraft is on the ground and the more time it is in flight. It has been estimated by one source that every saved minute of a turnaround has the potential to save about US$1 million per aircraft per year, depending on the number of flights and flight days an airline operates.

To increase the efficiency with which passengers can be moved out of and into aircraft, especially very large aircraft that have multiple entrances and two passenger levels, some airport terminal gates have two loading bridges available for such aircraft that can be extended either horizontally or vertically to service aircraft using two different doors. In one arrangement, an "over-the-wing" bridge is designed to be connected to an aircraft's rear door while a conventional loading bridge is connected to the aft door to provide two passenger loading bridges for Airbus 319-321 and Boeing 737 aircraft. Such an arrangement is described in U.S. Pat. No. 7,039,978 to Hutton and is also available from FMT Aircraft Gate Support Systems of Sweden. This type of passenger loading bridge must be designed to clear the aircraft wing height, also allowing for the height of winglets on the tips of most aircraft wings. Maneuvering an over-the-wing loading bridge into place can pose challenges.

Another type of dual passenger loading bridge system is described and shown in U.S. Pat. Nos. 7,275,715 and 7,614,585, assigned to Boeing. This complex system, which is designed to be used with an aircraft parked perpendicular to a terminal building in a "nose-in" orientation, may also include structure for handling baggage and cargo and for providing some aircraft utilities. The Boeing system has an arrangement of lateral bridge extensions that are required to connect one or more main bridge sections to doors on one or both sides of the aircraft. Although the intent of a dual passenger loading system, such as the Boeing system and the over-the-wing type of system, is to allow faster passenger egress and ingress, that objective has not always been achieved. It has been observed that the when dual loading bridges are available, the practice has been to use one loading bridge for first and business class passengers and the other for economy class passengers.

The use of multiple passenger loading bridges to enable connections with aircraft forward and rear doors is shown in U.S. Pat. No. 3,916,588 by Magill. Magill employs mobile, self-propelled passenger loading bridges that may be connected to a permanent passenger loading bridges from an adjacent gate to extend distances required to connect to an aircraft's rear door. Not only does this arrangement limit use of the adjacent gate by another aircraft, but it also is likely to block a significant area of the ramp around the aircraft to which it is connected.

For a number of years, aircraft utilities have been attached to passenger loading bridges and connected to aircraft to supply, for example, electric power, temperature and humidity-conditioned air, and compressed air to an aircraft at a gate during the turnaround process. In U.S. Pat. No. 3,521, 316, Adams et al describes providing these utilities to an aircraft concurrently with passenger boarding. The service transport unit described by McEntire et al in U.S. Pat. No. 5,149,017 includes a utility bundle attached to and designed to extend and retract with a passenger loading bridge, and the loading bridge-mounted heat exchanger with extensible supply and return lines described by Shepheard in U.S. Pat.

No. 4,620,339 provides utilities to a parked aircraft. The foregoing arrangements avoid the need for providing such aircraft services by separate conduits or connections not associated with a landing bridge and reduce the numbers of such structures in a terminal gate area.

U.S. Pat. No. 5,505,237 to Magne discloses a partially or completely automated aircraft refueling installation integrated into a passenger loading bridge to eliminate or reduce the need for fuel vehicles in a gate area. Improving aircraft gate turnaround by increasing the efficiency of gate services is not a stated goal of the systems in this or in the aforementioned patents.

The loading bridge arrangements described above, whether or not aircraft utilities are connected with the loading bridge, are all premised on providing connections with aircraft that are parked in a "nose-in" or slightly angled orientation relative to an airport terminal building so that the longest axial dimension of the aircraft is perpendicular or somewhat angled with respect to the terminal building. Consequently, passenger loading bridges are presently constructed to that they can be extended between the terminal and the aircraft at an angle that will provide an effective connection when an aircraft is parked at a gate. Many passenger loading bridges have rotundas or the like that can rotate and thus facilitate the connection between a loading bridge and an aircraft door, but alignment may still pose challenges. When aircraft are able to park so that the longest axial dimension is not perpendicular, but parallel, to a terminal building, extension and alignment of passenger loading bridges with aircraft doors is much simplified.

The advantages of moving an aircraft into a parking location parallel to a terminal and connecting a parallel parked aircraft to a terminal building were acknowledged by Hutton in U.S. Pat. No. 7,039,978. Hutton further emphasized very significant disadvantages presented by parallel parking an aircraft. It was noted that, not only do the aircraft maneuvers for parallel parking required greater terminal façade length than the nose-in orientation, but that departure of an aircraft from a parked parallel position requires substantial engine thrust to start and turn the aircraft. Additionally, engine exhaust from a turning aircraft is directed toward a terminal building, ground equipment, and personnel, disrupting ground operation activities. In U.S. Pat. No. 3,184,772, Moore et al describe and show an aircraft parked parallel to a terminal building with dual passenger loading bridges designed to provide connections to forward and aft aircraft doors, which facilitates alignment of the loading bridges with the aircraft. This arrangement, however, does not address the other stated disadvantages associated with parking an aircraft parallel to a terminal building.

A need exists, therefore, for a system and method for improving efficiency of aircraft gate services and turnaround. A need further exists for improved multiple function passenger loading bridges designed to be connected efficiently to multiple doors in an aircraft driven into a parking orientation parallel to an airport terminal building by an engines-off electric taxi system to provide efficient passenger egress and ingress simultaneously with aircraft gate servicing, particularly baggage handling and transfer services, so that baggage may be transferred directly from an aircraft to an airport baggage handling system.

SUMMARY OF THE INVENTION

It is a primary object of the present invention, therefore, to provide a system and method for increasing the efficiency of servicing of an aircraft driven into a parking orientation parallel to a terminal building at a terminal gate by an engines-off electric taxi system that provides efficient passenger egress and ingress simultaneously with providing aircraft gate servicing, thereby improving the efficiency of baggage transfer and other servicing and minimizing time an aircraft spends at a gate.

It is another object of the present invention to provide a system and method for improving efficiency of airport gate operations at an airport where aircraft are moved into a gate area and parked parallel to a terminal building without operation of aircraft main engines.

It is an additional object of the present invention to provide a system and method for improving efficiency of servicing of aircraft parked parallel to an airport terminal to reduce time spent at a terminal gate.

It is a further object of the present invention to provide a system and method for reducing time spent by an aircraft parked parallel to an airport terminal, wherein aircraft services are supported by an arrangement of a plurality of passenger boarding bridges and associated structures that enable passenger and baggage egress and ingress concurrently with the provision of services to the aircraft.

It is yet another object of the present invention to provide a system and method for improving efficiency of airport gate baggage transfer services and turnaround in aircraft driven to park parallel to a terminal by an engines-off electric taxi system that eliminates baggage transfer and handling vehicles during turnaround.

It is a still further object of the present invention to provide a system and method for improving efficiency of aircraft gate services and turnaround that employs a combination of loading bridges supporting aircraft baggage transfer and other services designed for quick connection to cargo doors and service ports on a terminal side of an aircraft driven to park parallel to a terminal by an engines-off electric taxi system and integral or portable stairs on an opposite side of the aircraft to maximize passenger egress and ingress through a maximum number of doors while baggage is being transferred and the aircraft is being serviced.

It is a still further object of the present invention to provide a system and method for providing improved delivery of aircraft baggage transfer and handling services during turnaround that may be supported by passenger loading bridges attached to multiple aircraft door or cargo locations and directly to an airport terminal baggage handling system.

In accordance with the aforesaid objects, a system and method are provided for improving efficiency of aircraft gate services and reducing time spent by an aircraft maneuvered into and out of parking locations parallel to an airport terminal by an engines-off electric taxi system, wherein aircraft utilities and services are supported by or on an arrangement of a plurality of passenger boarding bridges and associated structures that enable passenger and baggage egress and ingress concurrently with connection of utilities and provision of services to the aircraft. Passenger loading bridges and service connections may be made as soon as the aircraft arrives at a designated parking space. All connections and disconnections between aircraft and airport services are designed to be performed as quickly and efficiently as possible so that the loading bridges can be retracted from the aircraft, and the aircraft is ready to be driven away from the parallel parking location within a minimum amount of time after arrival. Baggage transfer capability may be provided for one or more passenger loading bridges, and connections may be made directly to an airport's baggage handling and transfer system to eliminate the need for baggage vehicles. To further maximize passenger transfer efficiency, aircraft stairs may be used for passenger transfer through aircraft doors not connected to loading bridges.

Other objects and advantages will be apparent from the following description, drawings, and claims.

DESCRIPTION OF THE INVENTION

The advantages of parking an aircraft parallel to an airport terminal building and the ability to facilitate terminal connections between forward and aft aircraft doors and passenger loading bridges have been recognized. Until the present invention, however, it has not been possible to overcome the major disadvantages associated with moving aircraft into parallel parking locations at an aircraft terminal building so that passengers and baggage may efficiently leave and enter an aircraft parked in a parallel orientation while an aircraft is simultaneously connected to selected utilities required for servicing the aircraft. Aircraft have not previously been able to move autonomously during ground travel without thrust from the aircraft main engines, and operation of aircraft engines in the vicinity of terminal gates poses safety challenges. The present invention provides a system and method for improving the efficiency with which an aircraft can be serviced and turned around at an airport terminal gate that enables an aircraft to travel, without operation of main engines, in a forward direction into a parking location parallel to a gate or terminal building, exchange arriving and departing passengers and baggage, be serviced concurrently while exchanging passengers, move in a forward direction out of the parking place, and taxi to a takeoff runway.

The present system and method not only increases the efficiency of gate operations, but it also increases the safety of gate operations by eliminating jet blast and engine ingestion hazards associated with operating aircraft engines near an airport terminal and the ground personnel and vehicles needed to support engines-on taxi. Aircraft taxi, parking, and ground travel in the present system are controlled primarily by aircraft pilots, who control aircraft ground maneuvers into and out of gate parallel parking locations. The efficiency of passenger movement into and out of a parked aircraft is maximized by the ability to use all, or at least a maximum number of, aircraft passenger doors for deplaning and boarding concurrently with the servicing of an aircraft. Flexibly movable passenger loading bridges can be extended to connect with a parallel parked aircraft and then retracted to maximize space at a parking location so an aircraft has a least a minimum clearance required to turn and leave the parking location at departure. This arrangement also permits more aircraft to fit into parking spaces parallel to a terminal and minimizes the time between an aircraft's arrival at and departure from a gate. Since utilities and servicing connections may be supported on the loading bridges, servicing of aircraft can begin upon the aircraft's arrival at a parking space as soon as the passenger loading bridge is extended and the required connections with the aircraft are made. Loading bridge-supported utilities and/or services are preferably designed to be quickly connected to and disconnected from corresponding aircraft utility and service ports or other connections. Additionally, the present system may be partially or completely automated to further improve the efficiency of airport gate operations. It is contemplated that baggage handling conveyors supported on loading bridges may be designed to connect directly to and be integrated with airport internal and/or other baggage handling conveyor systems that are currently available or proposed for construction and to be operated automatically with such airport systems to improve the speed and accuracy of baggage transfer.

To achieve maximum efficiency of airport gate operations and to minimize the time required for gate operations as described herein, aircraft are equipped with an engines-off electric taxi system. In a preferred engines-off electric taxi system, an electric drive motor is mounted within one or more landing gear wheels to power and rotate one or more of these wheels and to move the aircraft autonomously on the ground without reliance on aircraft main engines or tow vehicles. The preferred location for electric drive motor in the preferred electric taxi system is the aircraft nose landing gear wheels. Providing drive motors on one or more main landing gear wheels may also be suitable in some aircraft.

A preferred drive motor for an engines-off electric taxi system is an electric motor assembly, preferably powered by the aircraft auxiliary power unit, that is capable of operating at a torque and speed required to move an aircraft landing gear wheel and, therefore, an aircraft on the ground. An example of one of a number of suitable types of electric drive motors useful in an aircraft landing gear drive wheel that could be used effectively in the present gate traffic management system is an inside-out electric motor in which the rotor can be internal to or external to the stator, such as that shown and described in U.S. Patent Application Publication No. 2006/0273686, the disclosure of which is incorporated herein by reference. A range of motor designs capable of high torque operation across a desired speed range that can move a commercial-sized aircraft wheel and function as described herein may also be suitable electric drive motors in an engines-off electric taxi system used to move aircraft into and out of terminal gates as described herein. A high phase order electric motor of the kind described in, for example, U.S. Pat. Nos. 6,657,334; 6,838,791; 7,116,019; and 7,469,858, the disclosures of the aforementioned patents being incorporated herein by reference, may be effectively used as an electric drive motor in an engines-off electric taxi system. One particularly suitable electric drive means is a high phase order induction motor with a top tangential speed of about 15,000 linear feet per minute and a maximum rotor speed of about 7200 rpm, although other electric drive motors capable of a wide range of such speeds could be used in an engines-off electric taxi system to drive aircraft into and out of terminal gate parking spaces as described herein. The foregoing examples are intended to be illustrative and not limiting.

Figure 1:
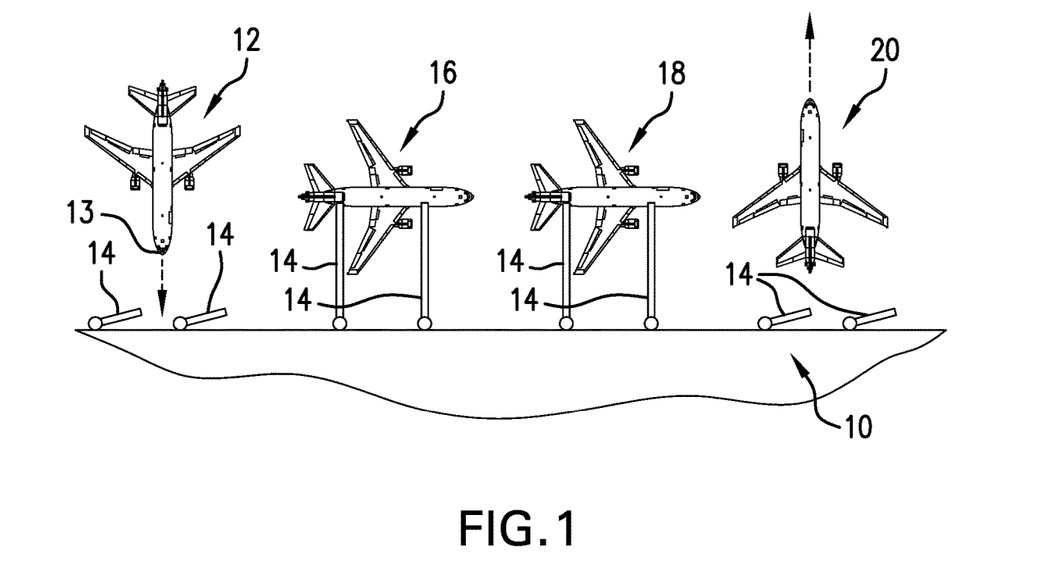
FIG. 1 is a diagrammatic representation of an airport terminal with aircraft parked parallel to a terminal building and shows aircraft maneuvering in a forward direction with an engines-off electric taxi system into and out of a gate to park in an orientation parallel to the terminal building with multiple boarding bridges for connection to the parallel parked aircraft.

Referring to the drawings, which are not necessarily to scale, FIG. 1 illustrates several aircraft equipped with engines-off electric taxi systems moving in a forward direction and taxiing toward, parked parallel to, and taxiing away from an airport terminal building 10. An arriving aircraft 12 is shown approaching the terminal 10 in a forward direction with the aircraft nose aimed toward the terminal and the longest axis of the aircraft perpendicular to the terminal. Flexibly movable extendable passenger loading bridges 14, as described below, are retracted as close to the terminal 10 as possible to provide maximum space for the aircraft 12 to be driven and maneuvered into a parallel parking position. Aircraft 16 and 18 are shown parked parallel to the terminal 10 at a designated gate location, with the passenger loading bridges 14 fully extended to connect to each aircraft. To assume this orientation, each aircraft rotates or turns 90° to park with the longest axis of the aircraft parallel to the terminal 10. The flexibly movable loading bridges 14 may be spaced along the face of the terminal to accommodate connections to two aircraft doors. The loading bridges 14 may remain in a retracted position close to the terminal and away from aircraft parking spaces to facilitate parking of the aircraft parallel to the terminal. Upon arrival at the terminal 10, an aircraft may turn as described and travel parallel to the terminal, if required, to an assigned parking space, which may be at a designated gate. An aircraft may also make this turn at the parking space. Two or more flexibly movable extendable loading bridges 14 may be provided for each aircraft parking space. Loading bridges 14 are shown extended to connect with the front and rear doors of aircraft 16 and 18. It is also possible to use access stairs (not shown) that are either integral with the aircraft or portable to maximize passenger egress and ingress from the aircraft by using doors that face away from the terminal 10. Stairs may be lowered or moved into place as soon as the aircraft has stopped in a parallel parking location without danger to ground personnel or passengers.

When an aircraft is ready for departure, the loading bridges 14 may be moved away from the aircraft and retracted to clear the parking space, and the aircraft pilot can activate and control the engines-off electric taxi system to turn the aircraft 90° so the nose is directed away from the terminal. If used, stairs are simultaneously moved away from aircraft doors. Departing aircraft 20 is shown driving away from the terminal 10.

All of the aircraft movements shown in FIG. 1 are in a forward direction. This enables an aircraft pilot to keep the aircraft travel area in view when the aircraft approaches the terminal and when the pilot is maneuvering the aircraft into or out of a terminal parking space. While not necessary with the present system, it is also possible to drive an aircraft in reverse by controlling the electric drive motor of the electric taxi system to move the aircraft in reverse, should reverse movement be required.

Figure 2:
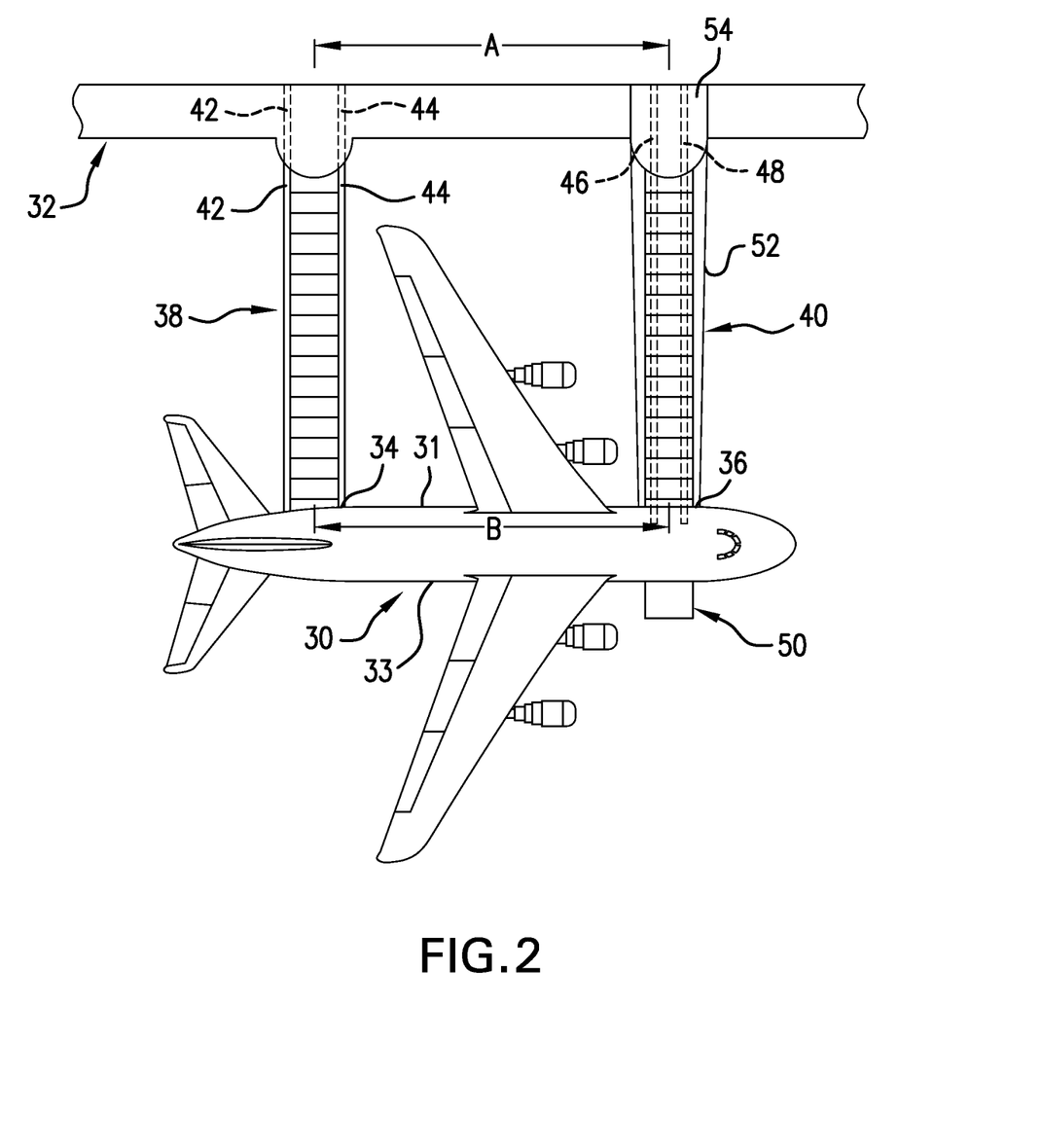
FIG. 2 is a diagrammatic illustration of an aircraft equipped with an engines-off electric taxi system parked parallel to an airport terminal building with connected dual passenger loading bridges and aircraft utilities and servicing connections supported by and associated with the boarding bridges, wherein a baggage handling system is supported by a front loading bridge connected to a front aircraft door.

FIG. 2 shows an aircraft 30 parked parallel to a terminal building 32. The aircraft shown has respective rear and forward doors (not shown) at locations 34 and 36 on the port side 31 of the aircraft. Dual loading bridges 38 and 40 extend from the terminal 32 to connect, respectively, with the doors at the aircraft rear and forward locations 34 and 36. Loading bridges currently used by airports are designed to connect to an aircraft parked in a "nose-in" orientation and typically must be extensively maneuvered to provide an accurate connection, usually with the aircraft's forward door. The loading bridges 38 and 40 may be spaced a distance apart A that corresponds to a distance B between the doors of aircraft of a type most frequently assigned to a gate parking location to facilitate alignment and connection of the loading bridges with the aircraft. Loading bridges may still require some maneuvering to accommodate and enable connection with aircraft of different types and with different door positions.

The preferred passenger loading bridges shown herein may be designed to allow them to extend toward and connect with an aircraft to permit passenger movement and aircraft servicing and then retract toward the terminal building 32 to maximize a clear area around an aircraft to permit the aircraft to move forward, turn 90°, and leave a gate or terminal as described above. There are available passenger loading bridge designs that may accomplish this basic purpose. A preferred flexibly movable extendable loading bridge design permits the loading bridge to be extended to connect with an aircraft and then retracted when disconnected to occupy minimal space. Loading bridges may also be collapsible in three dimensions and may move vertically upward or downward as required to make the connections desired and to avoid contact with aircraft wings. Loading bridges with a collapsible and extendible concertina-type structure, as well as loading bridges on wheels, are also available and may be used as described herein. A "pop-up" loading bridge that is raised from and lowered into a ground space may also be useful in the present system. One suitable type of loading bridge useful in the present invention is an extendable and retractable loading bridge available under the name of Crystal Bridge from ThyssenKrupp Airport Systems. Any other passenger loading bridge that may provide a connection between a parked aircraft to transfer passengers directly between a terminal and the aircraft and can then be collapsed, folded, retracted, or otherwise moved efficiently out of the parking space to provide a maximum area for aircraft turning and maneuvering as discussed above is contemplated for use in the present invention.

For some models of aircraft that have two passenger levels, a double level loading bridge may be provided. A double level loading bridge may be configured to provide passenger access to aircraft doors on both passenger levels. Aircraft utilities and services may be connected to one or both loading bridges, depending on locations of an aircraft's utility or service connections.

Not only should a loading bridge preferred for use with the present invention be easily moved into and out of connection with an aircraft, but a loading bridge should also be capable of adaptation to support a range of aircraft utilities and services, including baggage handling services. Loading bridges currently support utilities such as electrical connections between a terminal and an aircraft while an aircraft is parked at a gate. The present system and method for improving gate service efficiency and turnaround adapts passenger loading bridges to support as many utilities and service connections as possible to facilitate and speed up gate servicing and turnaround. The number of ground vehicles providing services or utilities may be reduced, which reduces ramp congestion and increases ramp safety.

Utilities and services supported by a loading bridge in the present system are preferably designed to connect quickly and efficiently to corresponding aircraft utilities and service ports or other connections and to disconnect as quickly and efficiently. FIG. 2 illustrates some services and utilities that may be supported or carried by a loading bridge and connected to an aircraft when the loading bridges 38 and 40 are connected to the aircraft 30. These services are intended solely as examples, and it is contemplated that other utilities and/or services may also be supported by one or more loading bridges as described herein.

When an aircraft is serviced between arrival and departure, waste water is removed and a supply of fresh water is provided. Conduits that may be used for this purpose may be attached to a loading bridge, such as loading bridge 38, preferably on the landing bridge surface facing the tarmac surface. For example, a conduit 42 may direct waste water from a waste water holding tank (not shown) on the aircraft to a waste water disposal (not shown) in a service area of the terminal 32 or elsewhere. A separate conduit 44 may direct fresh water from a fresh water supply (not shown) in the terminal to a fresh water tank (not shown) on the aircraft. Other conduits (not shown) may also be provided to move brown water or other waste from the aircraft 30 to a disposal facility in a terminal or ramp area. The conduits may be designed and formed of a material able to extend and retract with the loading bridge and remain functional after many such extensions and retractions. Connections are preferably designed to be secured as quickly as possible when the loading bridge is extended and unsecured as quickly as possible when it is retracted.

Electrical connections and the like may also be supported by a loading bridge. For example, electrical connections and/or conditioned air connections 46 and 48 may be attached to loading bridge 40 to provide a connection between a terminal electric system (not shown) and the aircraft electric system or between a heat exchanger in the terminal (not shown) and the aircraft air circulation system to provide electricity and cooled or heated air to the interior of the aircraft and the loading bridge while the aircraft 30 is parked. Although the aircraft main engines are not intended to be used to power movement of the aircraft into and out of a parallel parking location as described herein, a loading bridge may also carry a supply of compressed air to start an engine in the event the auxiliary power unit is inoperative or ground power is not sufficient. Electrical lines and air handling lines may also be adapted to extend and retract with the passenger loading bridge so that they are available to connect with the aircraft's corresponding lines when the loading bridge is connected to the aircraft. Connections and disconnections should be designed to be accomplished quickly and easily.

The methods presently used for unloading the baggage of arriving passengers and loading the baggage of departing passengers require dedicated baggage handling equipment and vehicles. In addition, current processes are time consuming and often result in injuries to baggage handling personnel as bags are physically transferred from an aircraft to one or more baggage transport vehicles. Damaged and misplaced bags are not uncommon with present baggage handling methods, which may sacrifice accuracy and care for speed. The system and method of the present invention avoids the aforementioned problems and provides an arrangement for handling aircraft passenger baggage and like cargo that is transferred into and out of an airport terminal.

Airports are aware of passenger dissatisfaction with current baggage handling procedures and are designing internal airport systems to increase the efficiency with which the volume of passenger baggage is transferred to and from aircraft. Some airports have already installed or propose to install computer-controlled systems of baggage conveyors capable of moving passengers' baggage within the airport from a check-in location to a departure gate. Coded tags and scanning devices may be employed to ensure that a passenger's baggage is conveyed within an airport's baggage transfer system to the correct departure gate and aircraft and, upon arrival, from an aircraft to an identified airport baggage pick up location. An automated baggage handling system at Heathrow Airport's Terminal 5, for example, employs about 11 miles of baggage conveyors that are controlled by 140 computers and may handle about 12,000 checked bags each hour. (See www.onebag.com/checking-bags) Other airports are either building new terminals or renovating older terminals to incorporate internal conveyor systems capable of screening and transferring baggage from check-in areas to gates. The present system and method enables an aircraft to quickly and easily connect to these airport baggage conveyor systems so that passenger baggage may be conveyed directly from the aircraft by a conveyor system supported by one or both of the front or rear passenger loading bridges with minimal exposure to weather conditions.

FIG. 2 illustrates a baggage or cargo conveyor 52, shown schematically associated with and supported, preferably beneath, a front passenger loading bridge 40. A suitable baggage conveyor may be a type of conveyor that may be operated to move baggage in reverse directions, depending on whether baggage is to be transferred from an aircraft to a terminal or whether baggage is to be transferred from the terminal to the aircraft. Such conveyors are known and may be structurally and functionally adapted to operate to transfer baggage in two directions when mounted on a passenger loading bridge. When an aircraft's cargo bay door is on a port side 31 of the aircraft that faces the terminal 32, the conveyor 52 may be extended directly into the aircraft's cargo bay (not shown). A baggage handling extension arm 50 may be provided on an opposite side 33 of the aircraft when the aircraft's cargo bay door (not shown) faces away from the terminal. The baggage handling extension arm 50 facilitates connection with a baggage and cargo conveyor 52 that extends under a loading bridge, such as front loading bridge 40 or rear loading bridge 38, to transfer baggage from an aircraft cargo bay to a baggage transfer location 54 within the terminal 32. Depending on the model and orientation of the aircraft, a conveyor 52 may be directly connected to the aircraft's cargo bay, and the baggage handling extension arm 50 would not be needed. A baggage conveyor and/or a baggage handling extension may be mounted to extend and retract with the loading bridge or to extend into and out of a holding and storage location near the terminal baggage transfer location 54.

The terminal baggage transfer location 54 preferably connects directly with an airport terminal baggage transfer conveyor system, such as one of those described above, which is designed to convey passenger baggage to identified destinations. For example, some passenger baggage may be conveyed to other gates when passengers are departing from the airport on other flights, and some passenger baggage may be conveyed to one or more baggage claim areas. Vehicles currently used to move baggage between aircraft and gates or between an aircraft and a terminal baggage collection location are not needed with the present system, which reduces the number of ground vehicles in an airport ramp area. Baggage handling ground personnel are no longer required to physically move baggage or other cargo from an aircraft cargo bay to a baggage transport vehicle and then to a terminal, with the result that the likelihood of injuries associated with baggage handling may be reduced or even eliminated. The speed with which baggage and cargo may be unloaded from and loaded in an aircraft's cargo bay may be increased, and aircraft departure delays currently due to the time required for baggage unloading and loading or accurate baggage transfer may be eliminated.

Figure 3:
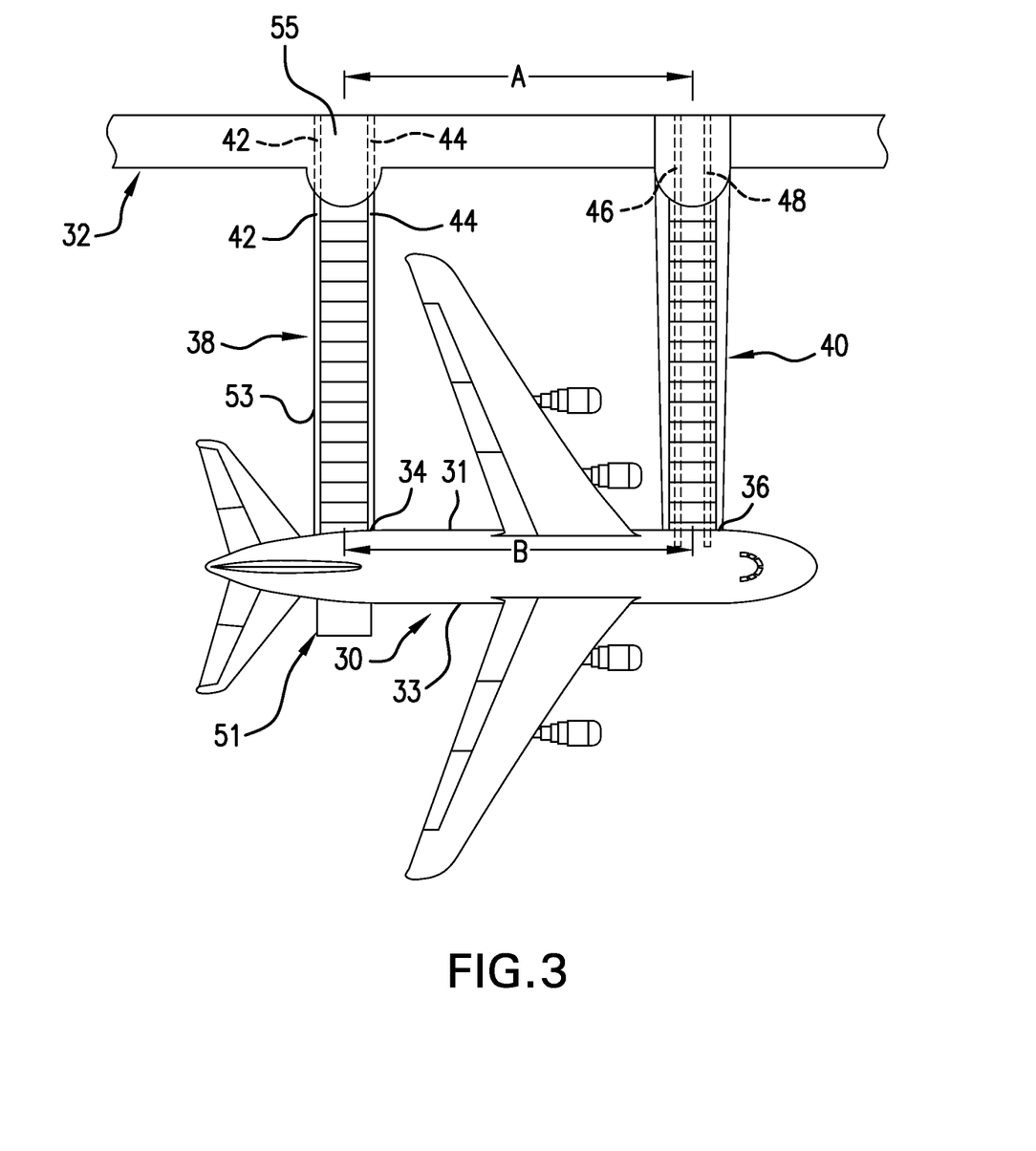
FIG. 3 is a diagrammatic illustration of an aircraft equipped with an engines-off electric taxi system parked parallel to an airport terminal building with connected dual passenger loading bridges and a baggage handling system supported by and associated with a boarding bridge connected to a rear aircraft door.

As noted above, a baggage conveyor 52 may be mounted with a forward loading bridge 40, as shown in FIG. 2. A baggage conveyor 53 could, in addition or alternatively, be mounted with a rear loading bridge 38, as shown in FIG. 3, to convey baggage and cargo from an aircraft cargo bay located near the rear of the aircraft to a terminal baggage transfer location 55. A baggage handling extension 51, which functions like the baggage handling extension 50, may be provided, if needed. The type of aircraft and location of cargo bay doors or other cargo bay access locations, as well as locations of airport terminal baggage handling locations, may dictate whether one or both of the front or rear loading bridge conveyors may be used most effectively to move baggage and cargo into and out of the aircraft. For maximum flexibility, all passenger loading bridges at an airport designated to be used at gates where aircraft equipped with electric drive systems for autonomous ground movement will be parked parallel to a terminal may support baggage conveyors.

The present invention further contemplates using loading bridges to provide other turnaround services, such as catering and refueling, for example. Catering supplies may be delivered through one of the loading bridges. A refueling system associated with a loading bridge is proposed in U.S. Pat. No. 5,505,237, the disclosure of which is incorporated herein by reference.

When an aircraft's doors or ports are not directly aligned with utility or other service connections on a side of an aircraft facing a terminal where loading bridges connect to the aircraft, attachments or extensions in addition to a baggage handling extension may be provided on the loading bridge to extend under or around the aircraft fuselage to enable the proper connections to be made.

For each service that may be connected or associated with a passenger loading bridge, a ground service vehicle is not needed to provide the service and, therefore, may be eliminated. Removal of vehicles from an airport gate and ramp environment reduces congestion in this area and minimizes the chance of errors, collisions and other incidents involving damage and/or injury to ground vehicles and personnel. As a result, costs for ground operations, including insurance costs, may be significantly reduced with the present system and method. Additionally, airport ground staff may be able to service aircraft with minimal or no exposure to adverse weather conditions.

Additional improvements in efficiency are possible when a maximum number of an aircraft's doors are used during passenger exchange and aircraft servicing. Turnaround efficiency may be further improved when a combination of terminal-to-aircraft connections with utilities and/or services-supporting passenger loading bridges as described above and stairs at doors not connected to loading bridges is employed. Since aircraft engines are not used to drive aircraft into terminal parallel parking locations in accordance with the present system and method, passenger loading bridges may be maneuvered into place and stairs may be lowered from an aircraft or moved into place by ground personnel as soon as the aircraft comes to a stop at its parallel parking location.

Most aircraft typically have at least forward and rear doors on opposite sides of the aircraft. Providing additional doors in an aircraft's body that may be connected to additional utility and service-supporting passenger loading bridges and/or to additional sets of stairs may further improve aircraft gate servicing and turnaround efficiency. For example, in addition to the two loading bridges 14 connected to each aircraft in FIG. 1, or the two utility and service connection-supporting loading bridges 38 and 40 connected to aircraft 30 in FIGS. 2 and 3, three or more additional loading bridges (not shown) may be connected to corresponding aircraft doors. One or more aircraft windows may be replaced with doors to accomplish this. If, for example, an aircraft window at the end of an exit row over the center of a wing is replaced with a door, a passenger loading bridge may be adapted to permit passenger egress and ingress in that location. The significant improvements in efficiency of passenger transfer and aircraft servicing and the reduction in aircraft gate time and costs possible with the present invention when a combination of loading bridges and stairs are used may justify the initial expense of such aircraft modifications.

Figure 4:
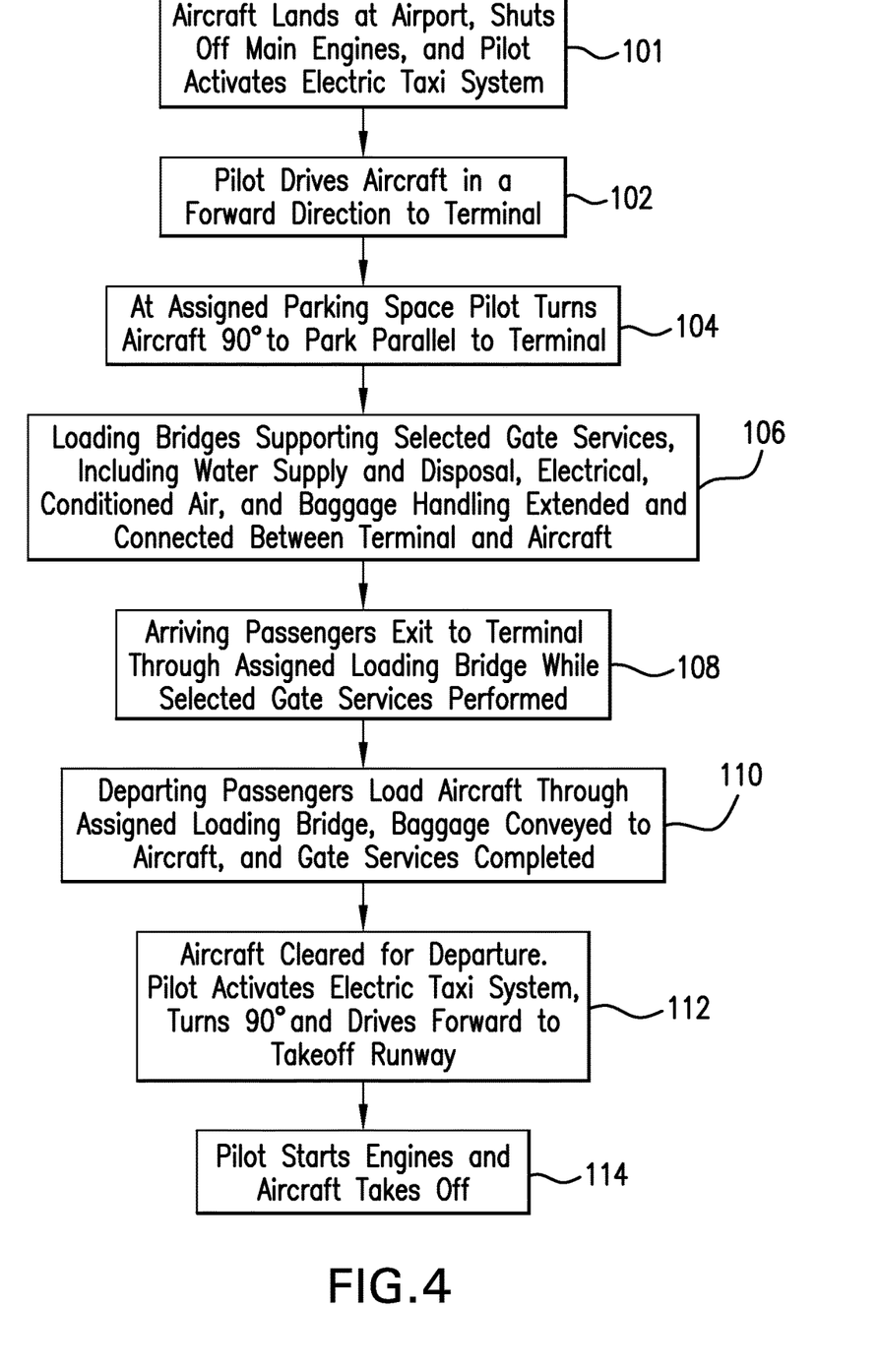
FIG. 4 is a flow chart describing a method for improving efficiency of aircraft gate services according to the present invention.

FIG. 4 is a flow chart representing, in boxes 101-114, the present method for improving efficiency of aircraft gate servicing and turnaround when aircraft are equipped with engines-off electric taxi systems. After an aircraft lands, the pilot shuts off the main engines and activates the aircraft's engines-off electric taxi system. (101) The pilot drives the aircraft in a forward direction to a terminal ramp area. (102) At an assigned gate or parking location, the pilot turns the aircraft 90° to park the aircraft with the longest axial dimension of the aircraft parallel to the terminal and then deactivates the electric taxi system. (104) Loading bridges supporting selected gate services or utilities, including at least water supply and disposal, electrical, conditioned air, and baggage handling, are extended from the terminal toward the aircraft and connected to each aircraft door on the terminal side of the aircraft. Services and utilities connections between the terminal and aircraft may be secured when the landing bridge is in place. If used, stairs may be lowered or moved into place by ground personnel. (106) Passengers arriving at the terminal exit through an assigned loading bridge, and/or by assigned stairs, to the terminal while arriving baggage is conveyed directly to the terminal, and the aircraft is serviced. (108) Departing passengers load the aircraft through an assigned loading bridge, and/or by assigned stairs, while departing baggage is conveyed from the terminal to the aircraft, and gate servicing is completed. (110) The aircraft is cleared for departure, and the pilot activates the engines-off electric taxi system, drives the aircraft forward to turn the aircraft 90° to head away from the terminal, and then drives the aircraft in a forward direction to a takeoff runway. (112) At a suitable location, the pilot starts the aircraft main engines, and the aircraft takes off, a minimum amount of time after arrival. (114)

While the present invention has been described with respect to preferred embodiments, this is not intended to be limiting, and other arrangements and structures that perform the required functions are contemplated to be within the scope of the present invention.

INDUSTRIAL APPLICABILITY

The system and method for improving efficiency of aircraft gate services and turnaround of the present invention will find its primary applicability where it is desired to take advantage of the benefits of moving aircraft during ground travel with engines-off electric taxi and parking these aircraft parallel to an airport terminal provided with service and utility—carrying loading bridges to enable concurrent passenger and baggage exchange and aircraft servicing.

The invention claimed is:

1. A method for improving aircraft gate servicing and efficiency of baggage transfer and reducing aircraft turn-around time at an airport where aircraft driven autonomously without aircraft engines by engines-off electric taxi systems are parked with a longest axis of the aircraft parallel to an airport terminal, comprising:
   a. at an airport terminal with a plurality of parallel parking locations providing for each parallel parking location at least two spaced flexibly movable extendable passenger loading bridges with a terminal end attached to the airport terminal and an opposite aircraft end for attachment to the aircraft in locations spaced apart a distance corresponding to a distance between the aircraft front and rear passenger access doors, activating and controlling engines-off electric taxi systems on the aircraft, driving the aircraft with the engines-off electric taxi systems in a forward direction from a landing location to the airport terminal, turning the aircraft, and parking the aircraft in one of the plurality of parallel parking locations with the longest axis of the aircraft parallel to the airport terminal with the front and rear passenger access doors in a side of the aircraft facing the terminal, and aligning with the at least two passenger loading bridges;
   b. as soon as the aircraft is parked at the parallel parking location, simultaneously extending the at least two passenger loading bridges, connecting the aircraft ends to the aircraft front and rear passenger access doors, and forming at least two perpendicular parallel connections with the at least two passenger loading bridges between the airport terminal and the aircraft;
   c. providing baggage transfer structures supported by two of the at least two passenger loading bridges and directly connecting the baggage transfer structures between a cargo hold of the aircraft and a baggage handling services location in the airport terminal when the two passenger loading bridges are extended to form the perpendicular parallel connections with the aircraft;
   d. concurrently transferring arriving passengers from the aircraft through one of the front or rear passenger access doors and one passenger loading bridge perpendicularly connected to the airport terminal and transferring departing passengers from the airport terminal through another parallel passenger loading bridge connected perpendicularly to another of the front or rear passenger access doors, and simultaneously transferring arriving passengers' baggage using the baggage transfer structure supported by the one passenger loading bridge and departing passengers' baggage using the baggage transfer structure supported by the another parallel passenger loading bridge; and
   e. when all departing passengers have entered the aircraft, all baggage has been transferred, and the aircraft is cleared for departure, retracting the at least two passenger loading bridges, activating and controlling the engines-off electric taxi system, and driving the aircraft with the engines-off electric taxi system in a forward direction away from the parallel parking location to a takeoff runway.

2. The method of claim 1, further comprising connecting the one passenger loading bridge to the front passenger access door, connecting the baggage transfer structure supported on the one passenger loading bridge between an aircraft front cargo bay located in baggage transfer connection with the baggage transfer structure and the airport terminal baggage handling services location, and providing baggage transfer services between the aircraft front cargo bay and the terminal baggage handling services location simultaneously with passenger transfer.

3. The method of claim 1, further comprising connecting the another passenger loading bridge to the rear passenger access door, connecting the baggage transfer structure supported on the another passenger loading bridge between an aircraft rear cargo bay located in baggage transfer connection with the baggage transfer structure and the airport terminal baggage handling services location, and providing baggage transfer services between the aircraft rear cargo bay and the terminal baggage handling services location simultaneously with passenger transfer.

4. The method of claim 1, further comprising providing baggage transfer and handling services between the aircraft and the airport terminal by accessing at least one of a front or rear aircraft cargo bay with a baggage handling extension of the one or the another passenger loading bridges and conveying baggage directly to the terminal baggage handling services location with a reversible conveyor supported under a corresponding the one or the another passenger loading bridge.

5. The method of claim 1, further comprising providing baggage handling services for an arriving aircraft as soon as the baggage transfer structures supported by the two parallel passenger loading bridges are connected perpendicularly between the aircraft cargo hold and the airport terminal baggage handling services location, and completing the baggage handling services for a departing aircraft when all departing passengers have entered the aircraft.

6. A method for improving efficiency of baggage transfer during aircraft turnaround and reducing time aircraft driven by engines-off electric taxi systems spend parked parallel to an airport terminal, comprising
   a. controlling the aircraft engines-off electric taxi system and driving the aircraft in a forward direction from a landing location to one of a plurality of parallel parking locations along a ramp-facing side of the airport terminal and an internal terminal baggage transfer system and parking the aircraft in an orientation wherein a longest axis of said aircraft is parallel to the airport terminal and front and rear passenger access doors on one side of the aircraft face the airport terminal;
   b. at the plurality of airport terminal parallel parking locations providing a number of flexibly movable extendable and retractable passenger loading bridges positioned and spaced apart at intervals corresponding to a distance selected to establish simultaneous perpendicular parallel connections through the number of passenger loading bridges between the airport terminal and front and rear doors of the aircraft driven by the engines-off electric taxi systems and parked in one of the parking locations parallel to the airport terminal;
   c. providing baggage handling and transfer conveyors supported by at least two of the number of passenger loading bridges and, as soon as the aircraft is parked parallel to the airport terminal, extending the at least two passenger loading bridges supporting the baggage handling and transfer conveyors, connecting the at least two passenger loading bridges perpendicularly with each terminal facing passenger front and rear access door on the aircraft, and providing multiple parallel passenger and baggage transfer connections for transferring passengers and baggage between the airport terminal and the aircraft;
   d. simultaneously with the transfer of arriving passengers exiting the aircraft and entering the airport terminal through a designated front passenger access door and connected passenger loading bridge and departing passengers leaving the airport terminal and entering the aircraft through a designated rear passenger access door and connected passenger loading bridge, transferring baggage between aircraft cargo bays and the internal terminal baggage transfer system with the baggage handling and transfer conveyors; and e. when all departing passengers are on the aircraft, all baggage is transferred, and the aircraft is ready for departure, retracting the at least two passenger loading bridges, controlling the engines-off electric taxi system, and turning and driving the aircraft in a forward direction away from the airport terminal parallel parking location to a takeoff runway.

7. The method of claim 6, further comprising providing passenger stairs at each front and rear passenger access door on the one side of the aircraft facing the terminal not connected to one of the number of passenger loading bridges and at each front and rear passenger access door on a side of the aircraft not facing the terminal, directing arriving passengers to exit the aircraft using a designated one of the front or rear door passenger stairs, and directing departing passengers to enter the aircraft using a designated other of the front or rear door passenger stairs simultaneously with passenger transfer through the at least two passenger loading bridges and baggage transfer.

\* \* \* \* \*